United States Patent [19]

Norota et al.

[11] 4,444,911
[45] Apr. 24, 1984

[54] PNEUMATIC CELLULAR AROMATIC POLYAMIDE ARTICLES AND PROCESS FOR THE PREPARATION THEREOF

[75] Inventors: Susumu Norota, Osaka; Yasuhiko Segawa, Yamaguchi; Shingo Emi, Osaka, all of Japan

[73] Assignee: Teijin Limited, Osaka, Japan

[21] Appl. No.: 495,927

[22] Filed: May 19, 1983

[30] Foreign Application Priority Data

May 19, 1982 [JP] Japan ................................ 57-83238

[51] Int. Cl.$^3$ .............................................. C08J 9/12
[52] U.S. Cl. ...................................... 521/82; 521/184
[58] Field of Search ................................. 521/82, 184

[56] References Cited

U.S. PATENT DOCUMENTS

| | | | |
|---|---|---|---|
| 3,695,992 | 10/1972 | Moulds | 521/184 |
| 3,728,292 | 4/1973 | McGrath et al. | 521/184 |
| 3,758,424 | 9/1973 | Stewart | 521/184 |
| 3,770,669 | 11/1973 | Reske | 521/184 |
| 4,091,022 | 5/1978 | Etchels | 521/184 |
| 4,183,822 | 1/1980 | Collington | 521/184 |
| 4,226,949 | 10/1980 | Merneger, Jr. | 521/184 |

Primary Examiner—Morton Foelak
Attorney, Agent, or Firm—Sughrue, Mion, Zinn, Macpeak and Seas

[57] ABSTRACT

Pneumatic cellular aromatic polyamide articles characterized by
(a) being articles prepared substantially from aromatic polyamide.
(b) said articles having numerous bubbles at the void ratio in the range of 10 to 95%,
(c) said bubbles being substantially enclosed in said articles, and
(d) said articles having an average thickness in the range of 0.2 to 10 mm on the cross section made by cutting them at right angles to the longest axis.

The present invention provides also a process for the preparation thereof. According to the present invention, there are suitably provided pneumatic cellular aromatic polyamide articles having a high strength and a wide range of void ratio, comparatively heavy thickness, excellent heat resistance and thermal insulation.

3 Claims, 13 Drawing Figures

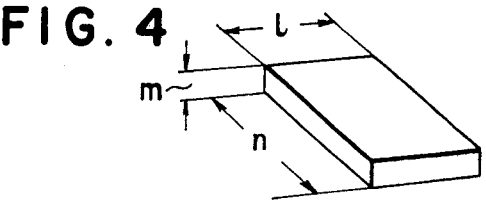
FIG. 5A FIG. 5B
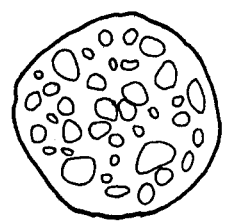 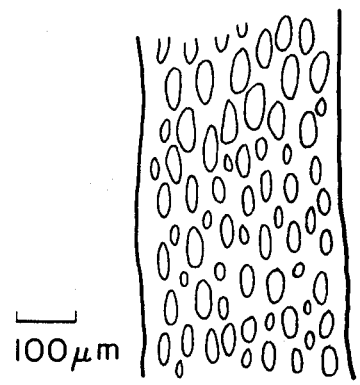
100μm
FIG. 6A FIG. 6B
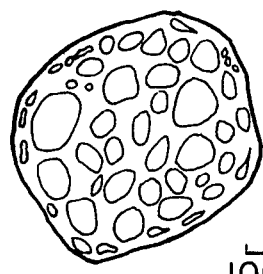 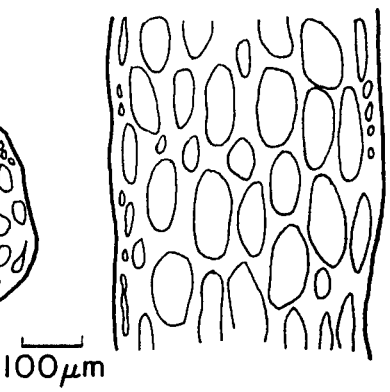
100μm 100μm

PNEUMATIC CELLULAR AROMATIC POLYAMIDE ARTICLES AND PROCESS FOR THE PREPARATION THEREOF

DETAILED DESCRIPTION OF THE INVENTION

The present invention relates to pneumatic cellular aromatic polyamide articles and a process for the preparation thereof. More particularly, the present invention is concerned with aromatic polyamide articles with numerous pneumatic cells enclosed therein which have great mechanical strength and are highly capable of performing functions of excellent thermal insulation and sound absorption.

Aromatic polyamide has been known as a high polymeric material having excellent heat resistance, flame resistance, and mechanical strength and research and development have been pursued as to the making of various articles from this high polymeric material, including, for instance, textile fibers and the secondary products prepared therefrom, paper, tapes films, machine parts, etc., part of which have already been put to practical use.

As the publicly known aromatic polyamide articles of this kind, those porous aromatic polyamidee articles, for instance, described in U.S. Pat. No. 4,226,949 and Japanese Patent Application Laying-Open No. 133339/81 are involved. However, these inventions have faults in that the process for the preparation of porous aromatic polyamide articles involves too complicated procedures, that the obtained articles lack the uniformity of quality and the mechanical strength, and that thick articles are not obtainable.

The specification of above mentioned U.S. Pat. No. 4,226,949, describes that "A wholly aromatic polyamide foam prepared by dealkylation of the N-alkyl wholly aromatic polyamidde wherein either the diamine residue or the dicarboxylic acid residue is para oriented, said foam having a density of 0.025 to 0.7 g/cm$^3$ wherein the cell walls are oriented as evidenced by a birefrigence of at least 10% of the maximum possible birefrigence and having substantially no residual N-alkyl groups." (see Claim 1) The same specification further describes that "Such wholly aromatic polyamide foams are prepared by heating a mixture of N-alkyl aromatic polyamide having at least one β-hydrogen atom on the alkyl group and plasticizer at a temperature of 250° to 340° C. for a time sufficient to remove substantially all of the N-alkyl groups wherein the mixture contains an aromatic sulfonic acid as catalyst." (see column 1 line 61 to column 2 line 6)

In the invention proposed by the above mentioned U.S. patent, foams are formed by the removal of an N-alkyl group from the wholly aromatic polyamide of a specific type having an N-alkyl group while heating in the presence of such a plasticizer as o-dichlorobenzene and a catalyst. The method itself is very complicated and the obtained articles are multiporous and their surfaces are also porous as well. Also the articles has a defect of failing to retain their form under tension or pressure applied to them.

Japanese Patent Application Laying-Open No. 133339/81 discloses a process for obtaining an aromatic polyamide foam sheet by extruding a composition which consists of (A) aromatic polyamide, (B) such a solvent of an amide type as N-methylpyrrolidon, dimethylformamide, etc., (C) such a halogenated hydrocarbon as dichloromethane, 1,2-dichloroethane, 1,1,2-trichloroethane, or 1,1,2,2-tetrachloroethane, and (D) halogenated of alkali metal- or alkaline earth metalcompound, contained at a specific ratio, into the air at a temperature between more than 40° C. higher than the boiling point of (C) a halogenated hydrocarbon and lower than the boiling point of (B) a solvent of an amide type, followed by introducing the obtained extrusion into an aqueous coagulating bath.

The method proposed by the above invention involves the preparation of a solution of aromatic polyamide, the partial removal of a solvent therefrom, and the introduction of the extrusion into a coagulating bath in order to obtain a foam sheet. The process requires the use of two or more solvents to form the form and the use of a salt of metal is also indispensable, thus complicating the process with procedures in the preparation of the composition and the recovery of the solvents and salt of metal. The obtained sheet is a porous sheet and its surfaces are rugged with numerous porelike pits and it is hardly possible ho obtain mono-filamentary products according to such an invention.

Accordingly, it is a major object of the present invention to provide pneumatic cellular aromatic polyamide articles in which the bubble are enclosed and distributed uniformly.

A further object of the present invention is to provide pneumatic cellular aromatic polyamide articles having a high strength and a wide range of void ratio.

Yet a further object of the present invention is to provide pneumatic cellular aromatic polyamide articles of comparatively heavy thickness.

A further and separate object of the present invention is to provide a process for the preparation of pneumatic cellular aromatic polyamide articles, wherein the work is carried out under simple processes which do not require the use of costly chemical materials.

Still another object of the present invention is to provide a process for the preparation of pneumatic cellular aromatic polyamide articles, wherein the size and amount of the bubbles which form the foam and the void ratio can be controlled optionally.

Still another object of the present invention is to provide pneumatic cellular aromatic polyamide articles which can be used as materials having excellent heat resistance and thermal insulation.

Still other objects and advantages of the present invention will in part appear hereinafter and will in part be obvious from the following description.

Such objects and advantages of the present invention can be achieved first by the pneumatic cellular aromatic polyamide articles of the present invention which are characterized by (a) being articles prepared substantially from aromatic polyamide
(b) being articles having numerous bubbles at the void ratio in the range of 10 to 95%,
(c) being articles having said bubbles substantially enclosed therein.
(d) being articles having an average thickness in the range of 0.2 to 10 mm on the cross section made by cutting them at right angles to the longest axis.

Also the present invention provides a process for the preparation of the above mentioned pneumatic cellular aromatic polyamide article by heating an aromatic polyamide article, which (i) is substantially composed of aromatic polyamide, (ii) contains moisture at a percent moisture absorption of 2 to 30% by weight,
(iii) has a average thickness of 0.1 to 3 mm, and
(iv) has an X-ray crystallinity of 30% and below,
at a temperature in the range between the softening point and the melting point while keeping the above mentioned percent moisture absorption at least until it is heated up to the softening point.

A more detailed description as to the present invention will be made hereinafter, starting first with a brief explanation on the attached drawings and photographs.

FIG. 4 shows an example of the aromatic polyamide plate-like rectangular parallel pipe suited for obtaining an aromatic polyamide unfoamed article.

FIG. 5-A and FIG. 5-B are sketches, as seen through a microscope, of the cross section cut at right angles to the longest axis and the cross section cut in parallel with the longest axis respectively of the pneumatic cellular aromatic polyamide article prepared by heating an unfoamed aromatic polyamide article (of a bristle) having a comparatively small percent moisture absorption. (These are the cross sections of the article obtained in Example 7.)

FIG. 6-A and FIG. 6-B are sketches, as seen through a microscope, of the cross section cut at right angles to the longest axis and the cross section cut in parallel with the longest axis respectively of the pneumatic cellular aromatic polyamide article prepaed by heating an unfoamed aromatic polyamide article (of a bristle) having a medium percent moisture absorption. (These are the cross sections of the article obtained in Example 2.)

Figure 7A:
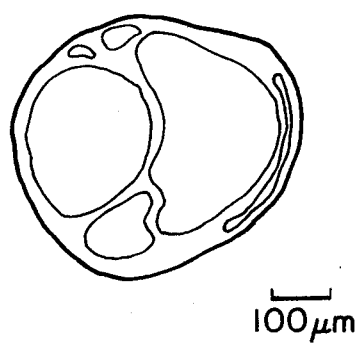
Figure 7B:
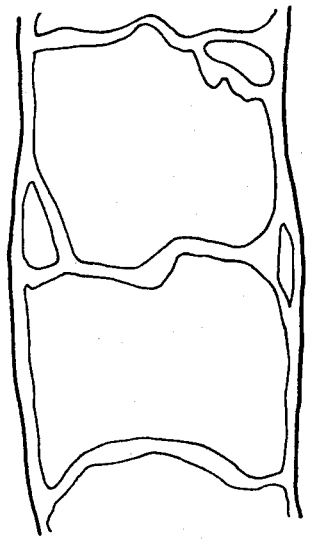

FIG. 7-A and FIG. 7-B are sketches, as seen through a microscope, of the cross section cut at right angles to the longest axis and the cross section cut in parallel with the longest axis respectively of the pneumatic cellular aromatic polyamide article prepared by heating an unfoamed aromatic polyamide article (of a bristle) having a large percent moisture absorption. (These are the cross sections of the article obtained in Example 6.

Figure 8A:
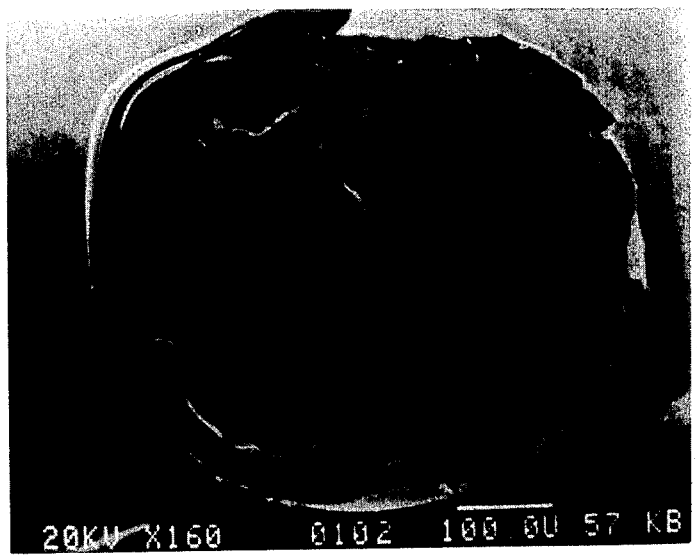
Figure 8B:
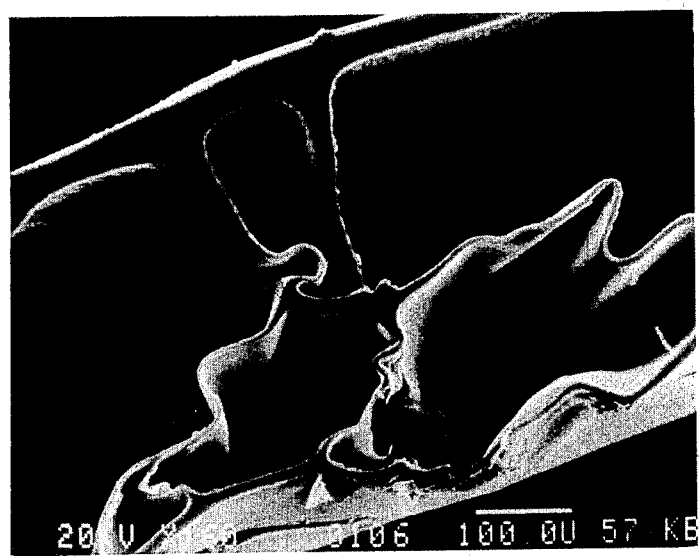

FIG. 8 shows magnified photographs, taken by a scanning electron microscope, of the cross section cut at right angles to the longest axis and the cross section cut in parallel with the longest axis respectively of a pneumatic cellular aromatic polyamide fiber obtained in Example 11 of the present invention.

(I) PROCESS FOR THE PREPARATION OF PNEUMATIC CELLULAR AROMATIC POLYAMIDE ARTICLES ACCORDING TO THE PRESENT INVENTION

A pneumatic cellular aromatic polyamide article which is the object of the present invention can be prepared from an aromatic polyamide article, which substantially does not contain foams but contains moisture and has a specific thickness and not so high degree of crystallinity, by heating it at a temperature higher than its softening point but not high enough to allow it to melt so that the moisture contained in aromatic polyamide may be vaporized to form the foam of vapor.

As mentioned in the above, an aromatic polyamide article of the present invention, which substantially does not contain the form (hereinafter referred to as "unfoamed article"), contains moisture at a percent moisture absorption of 2 to 30% by weight, desirably 4 to 15% by weight. In the present invention, an unfoamed article, which contains moisture at a ratio mentioned above, is heated at a temperature higher than its softening point and lower than its melting point. If the moisture content is less than 4% by weight, especially less than 2% by weight, the amount of the form arising from the moisture is also small, an article having the foam at a large void ratio is not obtained, thus making the object of the present invention unachievable. On the other hand, if the moisture content is more than 15% by weight, especially in excess of 30% by weight, too much moisture is vaporized to keep the foam enclosed within the article, thus allowing part or whole of the foam to burst out of the article to make its surface rugged with porous pits.

In the course of heating an unformed article, the moisture content must be kept in the aforementioned range at least until the temperature is raised up to its softening point. Therefore, it is advisable to see that the moisture content does not fall out of the aforementioned range in heating the unfoamed article to have it foamed.

Furthermore, the abovementioned unfoamed article must have an X-ray crystallinity of 30% and below. In an unfoamed article having an X-ray crystallinity in excess of 30% is used, a pneumatic cellular aromatic polyamide article having a void ratio of 10% or more is hardly obtained. The X-ray crystallinity of an unfoamed article should preferably be 20% or less, especially 15% or less is much preferable.

An X-ray crystallinity is determined by the ordinary X-ray diffractiometry. When the area of reflection contributed by the crystal phase is indicated by C and the area of reflection contributed by the crystal phase plus the amorphous phase exclusive of the aerial scattering is indicated by C+A, both based on the range of $2\theta$ fixed to 10° to 40°, the X-ray crystallinity (Xcr) is expressed by the following formula $$Xcr = \frac{C}{C+A} \times 100$$

The X-ray crystallinity of a polymethaphenylene isophthalamide article having a moisture absorption of 2 to 30% as mentioned above is about 10%.

A pneumatic cellular aromatic polyamide article, in which the object of the present invention lies, is prepared from an unfoamed article of about 0.1 to 3 mm thickness in average, desirably about 0.2 to 2.5 mm, by causing it to foam. It is hardly possible to obtain a foamed article having foams enclosed in itself from an unfoamed article having an average thickness of about 0.2 mm or less, especially from one whose thickness is 0.1 mm or less. In contrast to this fact, when an unfoamed article having an average thickness of about 2.5 mm or more, especially in excess of 3 mm, is used, it is difficult to obtain a finished article having the uniformly formed foam throughout it and sometimes an unfoamed portion is observed around the center or core of the finished article.

What is referred to as the "average thickness" of an article in the above may be defined as an average value of thickness of a cross section made by cutting the article at right angles to its longest axis. The longest axis of an article means the direction which follows the longest of the segments connecting the two points on the opposing most exterior walls of the article. The thickness of a cross section made by cutting the article at right angles to the longest axis means the minimum distance between the two parallel lines circumscribing the cross section.

The above definition of the "average thickness" of an article is applicable not only to an unfoamed article but also to a pneumatic cellular aromatic polyamide article obtained by causing an unfoamed article to foam.

An unfoamed article which is made to form in the present invention can give a foamed article when heated, disregard of its shape, so far as it has a moisture content, average thickness, and X-ray crystallinity as described in the above. When an unfoamed article is made to foam, a foamed article increasing in volume and corresponding in shape to the unfoamed article is obtained. Accroding to the present invention, it is possible to obtain a foamed article increasing in apparent volume about 10 to 2000%, desirably about 30 to 1000%, as compared with its original unfoamed article.

As for the shape of an unfoamed article or foamed article in the present invention, no limit is defined so far as it has an average thickness described in the above; however, the shape of a fiber, rod, ribbon, film, or sheet is especially advantageous. It is particularly desirable in the present invention to obtain a desired foamed article from an unfoamed article having the corresponding shape of a fiber or a film prepared according to the method described later.

In the present invention, said unfoamed article is adjusted to have its moisture content in the aforementioned range and is made to foam by heating up to a temperature higher than the softening point of aromatic polyamide from which it is made. As already referred to in the above, caution should be exercised to keep the percent moisture absorption of the unformed article in the aforementioned range until the temperature reaches its softening point while heating the article. If the raising of the temperature up to the softening point takes too much time, part of the moisture contained in the unfoamed article is released from it and the percent moisture absorptpion may fall short out of said range. Therefore, the heating of the unfoamed article should actually be effected at a considerably high rate. For instance, it is advisable to raise the temperature of the unfoamed article beyond its softening point at a heating rate in the range of 50° C. to 500° C./sec, desirably in the range of 80° C. to 400° C./sec. The maximum temperature for heating an article must be controlled to be below the melting point of aromatic polyamide, because a desired foamed article with foams enclosed therein can not obtained and the polymer itself starts degradation when the temperature is raised in excess of the melting point of aromatic polyamide. Therefore, the temperature for heating an article should be controlled to be in the range of higher than the softening point and lower than the melting point of aromatic polyamide, desirably in the range between "the softening point of aromatic polyamide+30° C." and "the melting point of aromatic polyamide−30° C.". The heating of an article at a temperature lower than the softening point of aromatic polyamide only causes dehydration and substantially effects no formation of enclosed foam, thus giving no desired article.

The softening point of aromatic polyamide is hereby defined as the temperature at which the aromatic polyamide specimen starts to show a sudden deformation while it is placed in the cylinder of a flow tester and heated at the temperature increased at a constant rate under a load of 100 kg/cm$^2$.

The melting point of aromatic polyamide can be determined by a thermal analysis conducted by means of a differential thermal analysis (DTA), differential scanning calorimetric analysis (DSC) and flow tester. Since the melting point of aromatic polyamide is in close proximity to its starting point of decomposition, these two points are usually observed overlapping each other in both DTA and DSC carried out in the air. Accordingly, it is advisable to conduct the measurement in an inert gas so that the starting point of decomposition may be shifted to a higher temperature and the melting point can be determined distinctively.

For instance, when polymethaphenylene isophthalamide is subjected to a thermal analysis according to DTA in nitrogen at a heating rate of 10° C./min., its starting point of melting is observed approximately at 400° C. When the same polymer is subjected to a thermogravimetric analysis (TG), its starting point of weight reduction is observed approximately at 430° C. (nearly equal to its starting point of decomposition). Though this polymer melts transitorily, it is advisable to make it foam at a temperature more than 30° C. lower than its melting point, since its melting point is in the immediate proximity of its starting point of decomposition.

Various methods may be adopted to heat the above-mentioned unfoamed article up to a temperature exceeding its softening point at a comparatively rapid heating rate and the following methods may be mentioned as examples:

(1) An unfoamed article is made to contact with a heated hot plate;

(2) an unfoamed article is exposed to the heated hot air;

(3) an unfoamed article is heated by an infrared heater, a near-infrared heater, or a far-infrared heater;

(4) an unfoamed article is high-frequency heated.

In all these cases, a foamed article having bubbles of uniform size enclosed therein is obtained simple by exposing an unfoamed article to the heat source. The process is very simple and industrially advantegeous.

The pneumatic cellular apomatic polyamide article thus prepared can be made to have the desired void ratio by controlling the percent moisture absorption prior to the heating. More particularly, when the moisture absorption is low, a foamed article of small void ratio is obtained, and when the moisture absorption is high, a foamed article of large void ratio is obtained in general.

The aromatic polyamide used in article of the present invention contain at least 50 mole%, preferably at least 70 mole%, of at least one recurring unit selected from the group consisting of recurring units derived from an aromatic dicarboxylic acid, recurring units derived from an aromatic diamine and recurring units derived from an aromatic aminocarboxylic acid. Especially preferred aromatic polyamides consist essentially of units derived from an aromatic dicarboxylic acid and units derived from an aromatic diamine.

Preferably, the units derived from an aromatic dicarboxylic acid are represented by the following formula

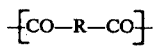

wherein R represents a divalent aromatic radical; the units derived from an aromatic diamine are represented by the following formula

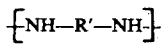

wherein R' represents a divalent aromatic radical; and the units derived from an aromatic aminocarboxylic acid are represented by the following formula

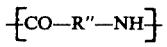

wherein R" represents a divalent aromatic radical.

The aforesaid units derived from aromatic dicarboxylic acids, aromatic diamines and aromatic aminocarboxylic acids are present so that the proportions of the carbonyl group (—CO—) and the amino group (—NH—) are nearly equal.

Illustrative of the divalent aromatic radical in the above formulae are p-phenylene, m-phenylene, 1,5-naphthylene, 2,6-naphthylene, 3,3'-, 4,4'- or 3,4'-diphenylene, 3,3'-, 4,4'- and 3,4'-diphenylether radicals.

In addition to the aforesaid units derived from aromatic dicarboxylic acids, aromatic diamines and aromatic aminocarboxylic acids, the aromatic polyamides which can be used in this invention may contain units represented by the above formulae in which the definitions of R, R' and R" are changed to divalent aliphatic radicals, for example radicals such as tetramethylene, pentamethylene and hexamethylene radicals.

Specific examples of such aromatic polyamides include poly(p-phenylene isophthalamide), poly(m-phenylene isophthalamide), poly(m-phenylene terephthalamide), poly(1,5-naphthylene isophthalamide), poly(3,4'-diphenylene terephthalamide), and copolymers of these. Among these, poly(m-phenylene isophthalamide) is especially preferred. And poly(m-phenylene isophthalamide), which has the inherent viscosity in the range of 0.3 to 3.0 when determined in N-methyl pyrolydone at the concentration of 0.5 g/100 ml is used most preferably.

(II) PNEUMATIC CELLULAR AROMATIC POLYAMIDE ARTICLE OF THE PRESENT INVENTION

The formation of the foam effected as mentioned above make it possible to obtain pneumatic cellular polyamide articles characterized by (a) being articles prepared substantially from aromatic polyamide
(b) said articles having numerous bubbles at the void ratio in the range of 10 to 95%,
(c) said bubbles being substantially enclosed in said articles, and
(d) said articles having an average thickness in the range of 0.2 to 10 mm on the cross section made by cutting them at right angles to the longest axis.

A pneumatic cellular aromatic polyamide article like the above, or a foamed article, generally has about 10 to about $2 \times 10^{11}$ bubbles per unit volume (1 cm$^3$) of the foamed article, each having a volume of about $5 \times 10^{-9}$ to about 10 mm$^3$. These bubbles are substantially enclosed in the article independently and separated from each other by the thin walls of aromatic polyamide. The bubbles are in a state of being enclosed or encased inside the exterior walls which surround the foamed article. Accordingly, the foamed article of the present invention is characterized by its smooth surfaces on all the exterior walls which scarcely show a trace or pit of pore leading to an enclosed bubbles.

It may be well assumed from the above fact that the exterior walls of an article of the present invention has a texture which is strong enough not to be broken in the foaming process.

The bubbles enclosed in a foamed article of the present invention exist to such a degree as to give the foamed article a void ratio of 10 to 95%.

The difinition of a void ratio and the method of its determination are given below.

DEFINITION OF A VOID RATIO $$\beta = \frac{V_1 - V_2}{V_1} \times 100\ (\%) \tag{1}$$

wherein $V_1$ is a volume surrounded and accupied by the exterior walls of the foamed article and $V_2$ is a substantial volume occupied by the polymer (aromatic polyamide) of the foamed article. (Therefore, $V_1 - V_2$ is a volume occupied by the bubbles enclosed in the foamed article.)

METHOD OF DETERMINING THE VOID RATIO ($\beta$)

$V_1$ and $V_2$ in the above formula (1) are obtained as follows.

$V_1$—When the foamed article has such a simple form as cylinders, prisms, etc., its volume is obtained by calculation from the actual measurements of "radius and height", "sides and height", etc. When the foamed article has a complicated form, its volume is obtained by the static water substitution method (ASTM D 792-50). In case where this method is adopted, caution should be used not to see that the bubbles which constitute the foamed article will be substituted by the test medium. However, the foams of the foamed article of the present invention are mostly enclosed and the test medium substitutes at a very slow rate, thus raising no substantial inconvenience.

$V_2$—$V_2$ is obtained from the following formula with the measured weight W of the foamed article and the specific gravity P of the polymer which constitutes the foamed article $$V_2 = W/P \tag{2}$$

The void ratio ($\beta$) of a foamed article of the present invention is 10 to 90%, more preferably 40 to 85%. If the value of $\beta$ is smaller than said range, the article will be less effective in thermal insulation, sound absorption, etc. and if the value of $\beta$ is larger than said range, it will have less strength.

The average thickness of the foamed article of the present invention is about 0.2 to about 10 mm, preferably about 0.3 to about 5 mm, particularly preferably about 0.5 to about 2 mm. If the thickness is smaller than the above-mentioned range, the article becomes less strong and if the thickness is larger than the above-mentioned range, an article having a high void ratio is hardly obtainable.

According to the present invention, a foamed article of so-called honeycomb structure having a void ratio ($\beta$) of at least 60% and foams of large volume is obtained as seen from the cross sections shown in FIG. 7 and FIG. 8.

Also a foamed article having a void ratio ($\beta$) of 20 to 60% and thickly distributed numerous comparatively small enclosed foams is obtained as shown in FIG. 5 and FIG. 6.

Since the pneumatic cellular aromatic polyamide article of the present invention has fine and strong exterior surfaces, it is never less strong as compared with the article before foaming and has an excellent strength specific character. Also the foamed article is heat resistant and is generally light in weight like other honeycomb structures, it can be widely used as structural material in various fields. Furthermore, the foamed article of the present invention can be used as useful raw material for making heat resistant and heat insulating materials having a constant coefficient of termal conductivity and heat resistant electrical insulating materials having a constant dielectric loss factor.

(III) UNFOAMED AROMATIC POLYAMIDE ARTICLES PROCESS FOR THE PREPARATION THEREOF

An unfoamed aromatic polyamide article to be foamed in the foregoing paragraph (I) may have any shape and may be prepared by any process provided that it satisfies the following requirements as mentioned before:

(i) To be substantially composed of aromatic polyamide, (ii) to contain moisture at a percent moisture absorption of 2 to 30% by weight, (iii) to have a average thickness of 0.1 to 3 mm in average, and (iv) to have an X-ray crystallinity of 30% and below, preferably 25% and below.

However, as far as the knowledge of the inventors of this invention goes, it is not easy to obtain an aromatic polyamide article having a comparatively heavy thickness as mentioned above. This is because an aromatic polyamide article (for instance, in a case of making a fiber) is usually prepared by the wet method and it is very difficult to obtain an article having a heavy thickness. Moreover, it may be impossible to obtain an aromatic polyamide melt according to the ordinary method since the melting point and the decomposition point of aromatic polyamide are in close proximity with each other and accordingly no thick melts made after the melt method have so far been put on the market.

However, the inventors of the present invention previously established and proposed new methods to obtain unfoamed articles ranging in thickness from fine thin ones to comparatively thick ones. These are the processes described in the specifications and claims of U.S. patent applications Ser. No. 293,269 and U.S. Ser. No. 465,339 (corresponding to European Patent Application No. 81303726.4 and 83300653.9 respectively).

According to the present invention, unfoamed aromatic polyamide articles obtained by the above-mentioned former methods can be made to foam and this way is desirable.

A brief description will be made hereunder as to the preparation of unfoamed articles from aromatic polyamide according to the methods proposed previously by the inventors. An explanation on the preparation of an unfoamed article from aromatic polyamide in the form of a fiber will be made first, followed by an explanation on the preparation of an unfoamed article in the form of a film or sheet.

An aromatic polyamide fiber-like article can be obtained by the process mentioned below.

A process for producing a fibrous assembly by extruding aromatic polyamide through a spinneret having numerous small openings, said process comprising using a die equipped with a spinneret having numerous closely spaced small openings having an opening ratio ($\alpha$), defined by the following equation, of at least 30%.

$$\alpha = \frac{V_a - V_f}{V_a} \times 100 \, (\%)$$

wherein $V_a$ (cm$^3$) is the total apparent volume of the spinneret which is taken within 1 cm$^2$ of the porous portion of the spinneret and $V_f$(cm$^3$) is the total volume of partitioning members defining the small openings which is taken within 1 cm$^2$ of the porous portion of the spinneret;

(a) continuous suppling aromatic polyamide powder into the surface of the die or (b) continuously stuffing aromatic polyamide in the form of a shaped mass into said die, said shaped mass having compression resistance such that at least in the initial stage of its stuffing into the die, it substantially retains its form in resistance to the stuffing pressure, and said shaped mass having such a shape that it measures more in one direction than in another; passing through the spinneret an electric current sufficient to give said fiber-forming polymer Joule Heat required for cutting said polymer by partitioning members defining the numerous small openings of the spinneret; and taking up the cut fiber-forming polymer as fine streams.

The above mentioned description of the method may be briefly summarized as follows: it is a method wherein powder of aromatic polyamide or a shaped mass thereof is continuously supplied to a die equipped with a spinneret having numerous closely spaced small openings having an opening ratio (2) and heated by the spinneret charged with electricity to be melt cut into the fiber assembly.

There is no limitation imposed on the shape of the small openings or the shape of the partitioning members defining the small openings in the above spinneret. The shape of the small openings may, for example, be circular, elliptical, triangular, or polygonal (e.g., tetragonal, hexagonal), and the partitioning members may have raised or depressed portions. Preferably, the spinneret used has small openings which are circular, triangular, tetragonal or hexagonal in shape. The partitioning members may be in the shape of fine filaments, or a thin plate whose surface having the largest area faces aromatic polyamide being passed through the small openings.

Figure 3A:
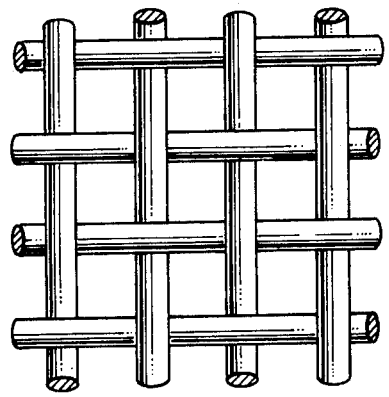
FIG. 3 is an enlarged drawing showing a typical example of the spinneret having numerous small openings to be used for the preparation of a fiber assembly of aromatic polyamide.
Figure 3B:
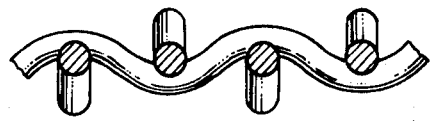

FIG. 3-A of the accompanying drawings illustrates one typical example of the spinneret having numerous small openings. The illustrated spinneret is a plain-weave wire mesh. FIG. 3-B shows a sectional view of the wire mesh shown in FIG. 3-A. In the plain-weave wire mesh shown in the drawings, each small opening is tetragonal, and each partitioning member is made of a fine filament. It will be seen from FIG. 3-B that the plain-weave wire mesh has a depressed portion in a partitioning member between adjacent small openings.

The spinneret used may also be a twill-weave wire mesh.

Some of the spinnerets used are disclosed as a mesh spinneret in the specification of U.S. patent application Ser. No. 133,288.

With regard to the above equation defining the opening ratio ($\alpha$) of the spinneret, the porous portion of the spinneret means that portion of the spinneret which has numerous closely spaced small openings.

In the equation defining the opening ratio ($\alpha$), $V_a$ is the total apparent volume which the porous portion of the spinneret occupies within a unit area (1 cm$^2$), and $V_f$ is the total volume which the partitioning members defining the small openings occupy within a unit area (1 cm$^2$).

It will be seen from FIGS. 3-A and 3-B that when two phantom surfaces having a unit surface area and being in contact with the surface and back of the spinneret respectively are considered, the total apparent volume ($V_a$) is defined as the volume of that portion of the spinneret which is interposed between these two phantom surfaces having the unit surface area. If the unit area is taken as 1 cm$^2$, $V_a$ equals D which is the thickness of the spinneret.

In practice, therefore, the $V_a$ value of a certain spinneret can be determined simply by measuring the thickness of the spinneret by means of a dial gauge having a contact surface with an area of 1 cm$^2$.

In determining the $V_f$ value of a certain spinneret, it is cut to a predetermined area, and submerged in a liquid such as water. The resulting increase in volume is measured. $V_f$ is obtained by converting the increased volume for each square centimeter of the spinneret.

Since the opening ratio ($\alpha$) is expressed by the following formula $$\alpha = \frac{V_a - V_f}{V_a} \times 100 \, (\%)$$

it will be understood that if a 1 cm$^2$ area of the spinneret is used as a standard in determining $V_a$ and $V_f$, the value showing $V_a$ represents the thickness (D) of the spinneret as illustrated in FIG. 3-B.

Preferably, the spinneret used has an opening ratio ($\alpha$) of about 40 to about 95%.

If the opening ratio $\alpha$ of the spinneret is too low (less than 30%), the polymer undergoes an increased resistance when instantaneously plasticized and divided by partitioning members defining the numeous small openings of the spinneret, and moreover, the time during which the polymer is in contact with the heated partitioning members increases. Hence, if the polymer is susceptible to thermal decomposition, it is difficult to mold. There is no critical upper limit to the opening ratio $\alpha$, but desirably, it is up to 95% in order to retain the strength of the spinneret and to prevent melt-adhesion of the polymer after plasticizing and dividing.

The spinneret used has preferably at least one, more preferably about 5 to about 1000, especially preferably about 10 to about 500, small openings per cm$^2$ of the molding zone of the spinneret.

When conventional stainless steel wire meshes are used as the spinneret, they preferably have a size of 5 to 80 mesh, more preferably 8 to 60 mesh.

The forming zone of the spinneret has a thickness of not more than about 10 mm, preferably about 0.1 mm to about 5 mm, more preferably about 0.2 mm to about 2 mm.

The spinneret must be made of a conductor in order to pass an electric current through it and thus generate Joule heat. For example, it may be made of a metallic element such as platinum, copper, titanium, tungsten, iron, nickel or chromium, or an alloy such as stainless steel, Nichrome or brass. Stainless steel and Nichrome are preferred because these materials have a moderate resistance (10 ro 100 microohms-cm) for easy generation of Joule heat required in this invention, a high melting point (more than 1000° C.), a low coefficient of thermal expansion, a high strength and good processability.

Usually, a current of 0.1 to several hundred amperes is directly passed through the spinneret. Thus, preferably an energy in an amount of about 0.5 to about 5,000 watts per cm$^2$ of the spinneret is imparted.

The process for fiber forming is practiced by continuously stuffing aromatic polyamide in the form of powder or a shaped mass into a die equipped with a spinneret having numerous small openings as defined by the opening ratio of at least 30% while passing an electric current through partitioning members of the spinneret, and cutting the polymer with the partitioning members.

The above process is applicable not only to polymers which have previously been known to be spun into fibers by melt spinning but also to polymers which have previously been considered to be difficult or impossible of melt spinning because of a decomposition point being close to the melting point or of a very high degree of polymerization.

In the afore-mentioned process for preparing aromatic polyamide fibers, aromatic polyamide can be used in the form of powder but it is more advantageous to use the polymer in the form of a shaped mass.

The shape of the shaped mass is such that it has a much larger dimension in one direction than in another. For example, it may be in the form of a flat plate, a rod or a film laminate. Such a shaped mass can be produced, for example, by compression-forming a powder of the polymer, or by melt-forming the polymer. On the other hand, from a melt-formable polymer, a shaped mass may be produced either by the compression-forming technique or the melt-forming technique.

The shaped mass used in the process of this invention should not easily be disintegrated when it is compressed. This property means that as will be stated hereinafter, the shaped mass should have such a compression resistance that at least in the initial stage of the shaped mass being stuffed into a die of the molding apparatus for the production of a aromatic polyamide fibrous assembly, it substantially retains its form against the stuffing pressure.

Preferably, the shaped mass is fed to the die after it has been formed into a shaped mass having a cross-sectional shape nearly corresponding to the cross-sectional shape of the passage of the die. For example, when the passage of the die has an elongated rectangular cross-sectional shape, the shaped mass is preferably in a flat plate having a cross-sectional shape nearly corresponding to the elongated rectangular shape. The thickness of such a flat plate corresponds to the length of each of the shorter sides of the elongated rectangular cross-sectional shape of the passage of the die. It will be easily understood therefore that the flat plate may be in the form of a single plate or a plurality of stacked plates. Likewise, it will be understood that films are fed as a laminate into the passage of the die, and the rod-like mass is fed into the passage of the die in the form of an assembly of rods having the shape which permits feeding into the passage of the die and being aligned with their longitudinal directions parallel to the direction of the passage of the die.

The important point of the shaped mass is that it has such compression resistance that it substantially retains its form against the stuffing pressure at least in the initial stage of its being stuffed into the die.

Since in the above process, a spinneret having numerous small openings as shown by its opening ratio of at least 30% is used, the aromatic polyamide can be cut into fine streams by the partitioning members defining the small openings without the need to impart so high an extruding pressure to the spinneret unlike the case of using a conventional spinneret having a very low opening ratio. According to the above process, therefore, the aromatic polyamide can be converted to fibers by simply stuffing its shaped mass continuously into the die. As can be understood from the foregoing statement, it is necessary that the shaped mass should have compression resistance such that it substantially retains its shape at least in the initial stage of staffing into the die, and enable the stuffing pressure to be propagated smoothly in the stuffing direction.

Preferably, the compression-formed mass has an apparent density 0.3 to 0.95 times its true density, i.e. the average true density of the materials constituting the shaped mass.

The average true density $\bar{\rho}$ is defined by the following equation.

$$\bar{\rho} = \sum_{i=1}^{n} x_i \rho_i$$

wherein $x_i$ is the weight fraction of a certain substance, which is defined by the following formula when the weight of the substance is represented by $w_i$ $$x_i = \frac{w_i}{\sum_{i=1}^{n} w_i}$$

and $\rho_i$ is the true density of the substance.

The compression-formed mass preferably has a packing ratio $\epsilon$, defined by the following equation, of 30 to 95%.

$$\epsilon = \frac{\sum_{i=1}^{n} V_i}{V_a} \times 100 = \frac{\sum_{i=1}^{n} \frac{w_i}{\rho_i}}{V_a} \times 100 \, (\%)$$

wherein $V_a$ is the apparent volume of the shaped mass, $V_i$ is the true volume of a certain substance constituting the shaped mass, $w_i$ is the weight of this substance, and $\rho_i$ is the true density of the substance.

Especially preferably, the compression-formed mass has an apparent density at least 0.5 times its its true density, and in other words has a packing ratio of at least 50%.

The process for fiber forming is carried out by stuffing a shaped mass of aromatic polyamide into the passage of the die, leading the shaped mass to a spinneret provided at the other end of the passage, passing through partitioning members defining the small openings of the spinneret an electric current sufficient to give Joule heat required for cutting the aromatic polyamide, and thereafter taking up the cut aromatic polyamide as fine streams.

Referring to attached FIG. 1, a detailed explanation will be made hereunder on an example of the continuous process of obtaining a pneumatic cellular aromatic polyamide article of the present invention wherein the fiber assembly is prepared from a shaped mass of aromatic polyamide, made to absorb moisture, and heated to foam.

Shaped masses 1 in the shape of a flat plate are aligned in series on a conveyor belt 2, and fed by means of three pairs of rollers 3 which force the shaped masses forward. The surfaces of the pair of rollers 3 are made of soft rubber, and the rollers stuff the plate-like shaped masses successively into a die 4 while holding them firmly. In the example shown in FIG. 1, the stuffing means consists of three sets of a pair of rollers. The number of rollers may be properly determined by the required stuffing force. Alternatively, the stuffing means may consist of at least one set of a pair of roller as shown in FIG. 1 and at least one set of a pair of belts capable of holding the shaped mass at their surface and back.

Because the aforesaid stuffing means are employed, the shaped mass must have such pressure resistance that it withstands the holding pressure of the pair of rollers or the pair of belts, and at least in the initial stage of its being stuffed into the die, it substantially retains its form against the stuffing pressure. It is necessary therefore that the shape of that section of the shaped mass which is taken vertically of the stuffing direction should nearly correspond with that of the cross section of the inlet of the die passage, and the area of the former should be equal to, or less than, that of the latter.

Figure 1:
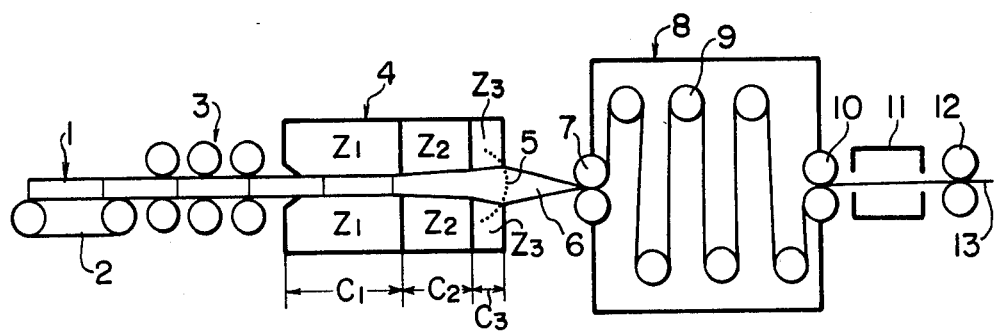
FIG. 1 shows an example of the continuous process to obtain a pneumatic cellular fiber product from the fiber assembly prepared from the shaped mass comprising aromatic polyamide according to the present invention.

As shown in FIG. 1 the passage of the die into which the shaped mass is stuffed is substantially linear from the inlet to the spinneret 5 provided at the end of the die.

Preferably, that section of the passage of the die which is taken at right angles to the passing direction of the shaped mass is of an elongated rectangular shape. The passage may have substantially the same shape and size all the way from its inlet for receiving the shaped mass (i.e., its inlet) to the spinneret. Or the passage may monotonously be broadened gradually, or first broadened and then narrowed, from its one end or from a point on its way to the other end in the direction of the spinneret.

FIG. 1, the passage is comprised of three zones $C_1$, $C_2$ and $C_3$ defined by blocks $Z_1$, $Z_2$ and $Z_3$ respectively. In the zone $C_1$ the passage has substantially the same shape throughout, and in the zone $C_2$, the passage is broadened gently and gradually. In the zone $C_3$, the passage is broadened to a greater extent than in the zone $C_2$. The passage shown in FIG. 1 is gradually broadened from the inlet for the shaped mass toward the spinneret. Preferably, the die used in this invention is equipped with heaters for pre-heating the polymer passing through the passage. In FIG. 1, the heaters are not indicated.

One advantage of preheating the aromatic polyamide the passage of the die is that the heat energy to be supplied from the heated partitioning members defining the numerous small openings of the spinneret 5 is reduced and cutting of the polymer is made smooth when the polymer is plasticized and cut by the partitioning members. For example, when it is necessary to heat the aromatic polyamide to 300° C. in order to plasticize and cut it (even when the polymer begins to undergo heat decomposition at a lower temperature than 300° C., for example at 200° C.), it is more desirable to preheat it to a temperature at which it does not begin to undergo heat decomposition, for example to 180° C. and then supply the remainder of the heat required for cutting from the partitioning members than to cause only the partitioning members to give the aromatic polyamide all the heat required for heating it to 300° C.

Another important advantage of preheating the aromatic polyamide in the passage of the die is that pores can be easily removed from a shaped mass having a packing ratio of less than 100%, namely a shaped mass having pores, while the shaped mass is passing through the passage. Investigations of the present inventors have shown that by heating a shaped mass having pores with the partitioning members of the spinneret without preheating, the aromatic polyamide can be completely melted and the cut fine streams of the shaped mass can be taken up continuously if it is done slowly, but that when the rate of take up is increased at this time, there can only be obtained bubble-containing fine streams. It has been ascertained on the other hand that when the aromatic polyamide passing through the passage of the die is preheated, preferably to a temperature near the softening point of the aromatic polyamide by increasing the temperature of the aromatic polyamide gradually from the inlet of the passage toward the spinneret, the packing ratio of the aromatic polyamide within the passage gradually increases from the inlet of the passage toward the spinneret, the packing ratio of the aromatic polyamide within the passage gradually increases from the inlet of the passage toward the spinneret, and the aromatic polyamide becomes substantially free from pores (its packing ratio reaches almost 100%) before the aromatic polyamide reaches the spinneret and bubble-free fine streams can be taken up smoothly. As will be clear from the above statement, gases contained in the shaped mass escape not in the stuffing direction of the shaped mass within the die passage, but in an opposite direction, i.e. toward the inlet of the passage. This discharging of gases proceeds very smoothly when the passage of the die is gradually broadened toward the spinneret, or has a broadened portion on its way to the spinneret, that is, when the aromatic polyamide can be softened and compressed easily within the passage.

The aromatic polyamide which has arrived at the spinneret 5 provided at the other end of the die passage receives from the partitioning members sufficient heat (Joule heat) for cutting by the partitioning members whereby it is plasticized and cut. The spinneret 5 is connected to a power supply (not shown) at about 100 V or about 200 V for example, and the amount of the electric current from the power source is controlled by a transformer and a variable resistor (not shown). The armatic polyamide is rapidly plasticized at those parts which have made contact with the partitioning members defining the small openings of the spinneret and then extruded. The cut fine streams 6 of the aromatic polyamide are then taken up. The take-up is carried out forcibly at a rate larger than the extrusion rate of the aromatic polyamide. A pair of rotating rollers 7 shown in FIG. 1 are sufficient for effecting this take-up.

The take-up is carried out such that the apparent draft represented by the following equation is at least 1, preferably at least 10.

$$D_a = \frac{V_R \times S_o}{V_o}$$

wherein $V_R$ is the take-up speed in cm/min., $S_o$ is the area in cm$^2$ of the forming zone of the spinneret, and $V_o$ is the true volume in cm$^3$/min. of the shaped mass to be converted to fibers per minute when it is calculated for a packing ratio of 100%.

It is seen from the above description that the forming system is simplified by processing the starting aromatic polyamide into a shaped mass of a definite shape and assigning the role of "plunger" to the shaped mass. The plunger-like role of this shaped mass is assigned by the stuffing means such as a pair of rollers. hence, at least in the initial stage of being stuffed into the die, the shaped mass itself should have such a compression resistance and shape which enable it to be stuffed, as in the case of a rigid plunger.

The force required to extrude the shaped mass from the spinneret, i.e. the stuffing force ($F_p$) is equal to the back pressure ($F_5$) plus the sum ($F_4$) of the internal frictional resistance of the shaped mass and its external friction resistance with respect to the wall of the die passage during the softening and compression of the shaped mass. Accordingly, the shaped mass should at least have such pressure resistance as to withstand the stuffing force ($F_5+F_4$), and the stuffing means should have the ability to generate a stuffing force sufficiently higher than $F_5+F_4$.

Detailed investigations of the present inventors have shown that the back pressure $F_5$ of the spinneret depends upon the type of the spinneret, the amount of electric current, the type of the aromatic polyamide, the rate of extrusion, etc., and the frictional resistance $F_4$ is dominated substantially by the external frictional resistance which depends upon the length of the die passage, variations in its thickness, the temperature of the die, the material of which the wall of the passage is made, the type of aromatic polyamide, etc., and is not substantially dominated by the internal frictional resistance attributed to the deformation of the shaped mass. To practice the above process while maintaining the stuffing force $F_p$ at a minimum value is ideal in saving energy and broadening the range of applicability of the shaped mass. For this purpose, it is most effective to provide a broadened zone in the passage of the die as shown in FIG. 1. Preferably, the coefficient of friction of the passage wall should be minimized by coating it with a fluoro-carbon resin or ceramics or applying a satin-finished plating. Furthermore, when the shaped mass is to be pre-heated, the shaped mass and the passage of the die should be prevented from becoming tacky by avoiding an abrupt rise in temperature.

If no measure is taken to reduce the frictional resistance $F_4$, it may sometimes reach 5 to 10 times as high as the back pressure of the spinneret ($F_4=5F_5-10F_5$). But if an effective measure is taken, $F_4$ can be reduced to less than 1/10 or less $F_4$ ($F_4<E_5/10$), and it is also possible to make $F_4$ substantially equal to $F_5$ ($F_4=F_5$). A a result of measuring the back pressure $F_5$ of the spinneret under various conditions, it has been found than $F_5$ is about 1 to 20 kg/cm$^2$ (1 kg/cm$^2<F_5<20$ kg/cm$^2$). Accordingly, the shaped mass should have a compression resistance of preferably at least 1 kg/cm$^2$, preferably up to 20 kg/cm$^2$. When the pair of rollers shown in FIG. 1 are used as stuffing means for giving a stuffing force $F_p$ to the shaped mass, the holding pressure ($F_1$) of the rollers should be made not more than the compression strength of the shaped mass. The maximum stuffing force $F_3$ of a pair of rollers is limited by the coefficient of friction between the rollers and the shaped mass and the holding pressure $F_1$ of the rollers, and satisfies the relation $F_3 < 2\mu F_1$. In order, therefore, to obtain the stuffing force $F_p$ required for the fiber formation by means of multiple sets of a pair of rollers, the number of such sets, $N_R$, should be prescribed at $N_R > F_p/2\mu F_1$. Since the number $N_R$ of such sets of a pair of rollers is desirably as small as possible, the rollers should be made of a material having a high coefficient of friction. Investigations of the present inventors have shown that soft rubber having a hardness of 40° to 70° is preferred as such a material.

A preferred shape of the stuffable is a plate-like rectangular parallelpipe as shown in FIG. 4. Let the inlet dimensions of the passage of the die by $d_1$ and $e_1$ as shown in the drawing and the dimensions of the shaped mass be m and n as shown in FIG. 4, the plate-like rectangular parallelpipe should evidently meet the requirements $m \leq d_1$ and $n \leq e_1$.

The shaped mass may be in various other shapes. For example, it may be in the shape of a rectangular parallelpipe made by stacking films or thin plates such that it conforms to the inlet size of the passage of the die; in the shape of a plate having a depressed portion and a protruding portion combined in the stuffing direction; or in the shape of a plate-like structure obtained by aligning rods in the stuffing direction. Needless to say, shaped masses of these shapes should also satisfy the aforesaid relation $m \leq d_1$ and $n \leq e_1$. There is no particular restriction on the length of the shaped mass in the stuffing direction. As its length becomes larger, the shaped mass is required to have more flexibility against bending.

As stated hereinabove, the passage of the die may be substantially linear from its inlet for receiving the shaped mass to the spinneret. Or it can be monotonously broadened, or first broadened and then narrowed from the inlet toward the spinneret starting at the inlet or a point displaced from it. The shape of the passage of the die bears a significant meaning in order that entrained air can be discharged from the shaped mass before the shaped mas reaches the spinneret depending upon the packing ratio of the shaped mass, the properties of the aromatic polyamide constituting the shaped mass, etc. For example, when a shaped mass having a packing ratio of about 50% obtained by compression molding of a powder of poly(m-phenylene isophthalamide) (PMIA) having an intrinsic viscosity of about 1 is used, a compression pressure of about 2 kg/cm$^2$ is required to compress it to a packing ratio of about 100% while the temperature of the passage of the die is maintained at not more than 350° C. at which heat decomposition of PMIA is unlikely. In order to transmit this compression pressure efficiently to the aromatic polyamide existing in the vicinity of the spinneret through the shaped mass existing outside the die, it is preferred that the passage of the die is broadened monotonously from its inlet for receiving the shaped mass toward the spinneret starting at the beginning of the passage or at some point displaced from it. Such a passage is composed of, for example, a first parallel zone ($C_1$), a second gently broadened zone ($C_2$) and a third gently and further broadened zone ($C_3$), as illustrated in FIG. 1. In order to assign the role of a rigid plunger to the shaped mass of PMIA having a packing ratio of less than 100%, the shaped mass is heated in the first zone to a temperature lower than the glass transition point (about 260° C.) of PMIA, for example about 250° C., and in the second zone, heated to the temperature at which PMIA begins to the softened (about 300° C.) to aid in compression and accelerate removal of gases. In the third zone, the shaped mass is heated to a temperature at which PMIA begins to be decomposed (about 350° C.) to compress it fully and remove the gases.

The shaped mass (polymer) in the passage of the die is heated preferably such that the heating temperature becomes higher as the shaped mass approaches the spinneret, as stated hereinabove.

The above process for fiber forming can be practiced whether the normal vector of the discharging surface of the spinneret is in the direction of gravity, or in a direction opposite to the gravity direction, or in a direction at right angles to the direction of gravity (i.e., in the horizontal direction). In other words, in whatever direction the discharging surface of the spinneret faces, it is possible to extrude a aromatic polyamide from the discharging surface of the spinneret and take up the resulting fibrous assembly.

It should be understood therefore that the die may include those positioned as stated above in addition to the dies shown in FIG. 1 in which they are positioned in a direction at right angles to the gravity direction (i.e., in the horizontal direction).

When the die is positioned in the horizontal direction as in FIG. 1, it is possible to stuff the shaped mass horizontally into the die and take up the fiber assembly extruded from the spinneret in the same direction. This brings about the advantage that the supply of the shaped mass into the die and the supplying of the taken-up fiber assembly to the subsequent step can be carried out industrially beneficially.

As described hereinabove, the above process provides a very advantageous industrial process in which the shaped mass of aromatic polyamide in the passage of a die is maintained not in the molten state but in a state called, "leather-like or rubbery state" in the field of rheology which is at a temperature intermediate the melting point and the glass transition point, and instantaneously plasticized in the vicinity of the spinneret and thus molded into a fiber assembly.

The aromatic polyamide fiber assembly thus prepared is suited for obtaining a foamed article of the present invention. Out of such fiber assembly, fibers whose average thickness (that means the shortest major axis of the cross section out at right angles to the fiber's lengthwise axis) is in the range of about 0.1 to about 3 mm, preferably about 0.2 to about 2.5 mm are used as material to be foamed.

Especially those aromatic polyamide fibers obtained according to the aforementioned method of FIG. 1 have the X-ray crystallinity of less than 30% in general and less than 20% in most cases.

The aromatic polyamide articles obtained according to the aforementioned method of FIG. 1 are required to be given moisture so that they may have a moisture content of approx. 2 to 30% by weight, preferably approx. 4 to 15% by weight before they are subjected to the foaming treatment according to the present invention.

In order to give moisture to the aromatic polyamide articles to make them have the abovementioned moisture content, they may be immersed in water or hot water or they may be brought into contact with steam in the box. The moistening treatment may be conducted under atmospheric pressure or under increased pressure. In the industrial continued process, it is advantageous to make the unfoamed articles come into contact with steam under high temperature and pressure as shown in FIG. 1.

To make an additional explanation as to FIG. 1, the fiber assembly which is brought out of the spinnert 5 of the die 4 is taken up by a pair of rotating rollers 7 and fed into the box 8. This box 8 is a moisturizer and filled with steam. Six guide rollers 9 are installed in the box 8 so that the fiber assembly or unfoamed article may have enough residense time to get a desired moisture content. The number of the rollers, of course, can be increased or decreased depending upon the conditions including the size of the box, residence time required by the unfoamed article, temperature and pressure of steam, etc.

The residence time of the unfoamed article in the moisturizing box 8 is determined by the temperature of steam, thickness of the article, and desired moisture content; however, it can be determined by conducting a simple experiment.

A pair of rotating rollers 10 are set at the outlet of the box 8 in FIG. 1 and the moistured unfoamed article is taken out by the rollers 10 and is then heated to foam. It is critically advisable to carry out the heating promptly up to a temperature higher than the softening point of aromatic polyamide as described before.

FIG. 1 shows a method in which the heating box 11 is used as a means for heating. When the temperature rises in excess of the softening point, the foaming is completed in a very short time. Therefore, the time required for the article to pass through the heating box 11 may be comparatively short. A proper means of heating is equipped in the heating box 11 to heat the unfoamed article up to a desired temperature as mentioned before.

The article 13 foamed in the heating box 11 is taken out by a pair of rotating rollers 12 and brought forward to the next process where it is utilized as foamed product.

Figure 2:
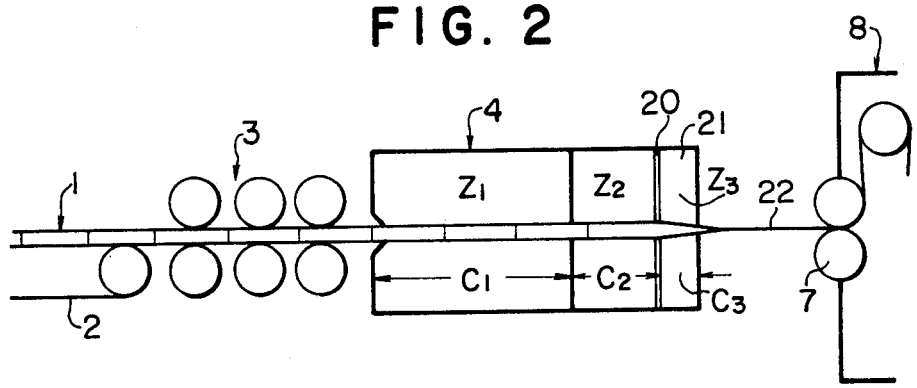
FIG. 2 shows an example of the continuous process to obtain a pneumatic cellular film or sheet product from the film or sheet prepared from the shaped mass comprising aromatic polyamide according to the present invention.

An explanation shall be made as to the process wherein unfoamed aromatic polyamide articles in the form of a film or sheet are obtained and then made to foam referring to FIG. 2. In FIG. 2, as in FIG. 1, shaped masses in the form of a flat plate are aligned in series on the conveyer belt 2, and fed by means of three pairs of rollers 3 which force the shaped masses forward into the disk.

The structure of the die 4 does not differ basically from the one shown in FIG. 1 with the exception of the end of the die 4 which is made differently from the one shown in FIG. 1 in order to obtain articles in the form of a film or sheet.

The passage in the die 4 shown in FIG. 2 also comprises three zones $C_1$, $C_2$ and $C_3$ defined as the blocks $Z_1$, $Z_2$ and $Z_3$ respectively. The block $Z_3$, which occupies the end part of the die 4, indicated by the numeral 21 has a slit having a clearance of about 0.1 to about 5 mm, preferably about 0.2 to about 4 mm, by which the shaped mass is made into an unfoames film or sheet article. The slit is designed to be charged with electricity for heating and is insulated by the insulator 20. The pass in the block $Z_3$ is tapered to become thinner than the pass in the block $Z_1$ and block $Z_2$. The aromatic polyamide film or sheet article discharged from the slit is taken up by a pair of rotating rollers 7 and fed into the moisturizing box 8. The moisturizing box 8 and the succeeding process are omitted from FIG. 2, since they do not differ basically from the process for foaming the fiber assembly shown in FIG. 1. Accordingly, a foamed film or sheet article can be obtained by combining the process described in relation to FIG. 2 and the one described in relation to FIG. 1.

The present invention is described in detail by the following examples.

EXAMPLE 1 TO 5

The largest possible fiber assembly of poly(m-phenylene isophthalamide) comprising fibers each having a size of 2,000 denier in average and a nearly square cross section with all four sides approx. 400 μm long respectively was obtained by extruding dried polymer powder, 50 μm in average particle size, of poly(m-phenylene isophthalamide) (whose intrinsic viscosity was 1.2 determined in N-methylpyrrolidone (NMP) at 30° C.) obtained by polymerizing m-phenylenediamine and isophthalic acid chloride at the tetrahydrofuran-water interface with the use of a vertically installed extruder of plunger type (with a barrel measuring 10 mm in internal diameter and 100 mm in length); thus extruded polymer powder was supplied to a wire mesh (made of stainless steel wire measuring 0.45 mm in diameter, 20-mesh plain weave, having a void ratio of 78%) sealed with an inorganic sealant of alumina type leaving a circle having a diameter of 8 mm unsealed to form a spinneret and fitted beneath the extruder, which was charged with electricity of about 3.5 w/cm² to melt the polymer powder at approx. 420° C. The polymer was then made to melt flow through the fine meshes and the cooling air was blown to the discharging side of said wire mesh at a rate of about 0.5 m/sec to obtain a stream of fine fibers. The fine fibers were taken up at a rate of 0.2 m/min to make the fiber assembly.

The fibers of this assembly were left in a desicator containing sulfuric acid where the relative humidity was 65% at 22° C. for 24 hours to obtain unfoamed aromatic polyamide fiber articles (softening point 260° C.) having a percent moisture absorption of 8.5% and an X-ray crystallinity of 9%. The fiber articles of the prescribed length were made to continuously pass at a rat of 1 m/min while contacting the one meter long hot plate whose temperature was controlled to shift in the range of 200° C. to 440° C. The void ratio, minimum thickness, strength, and elongation percentage of thus foamed fiber articles at the respective temperatures are shown in Table 1.

TABLE 1

| Example | Temperature of hot plate (°C.) | Void ratio (%) | Minimum thickness (mm) | Strength (g/de) | Elongation percentage (%) |
|---|---|---|---|---|---|
| 1 | 200 | 0 | 0.4 | 1.4 | 32 |
| 2 | 260 | 65 | 0.9 | 1.3 | 30 |
| 3 | 320 | 75 | 1.1 | 1.2 | 27 |
| 4 | 380 | 75 | 1.1 | 1.1 | 21 |
| 5 | 440 | 40 | 0.8 | 0.4 | 11 |

EXAMPLES 6 TO 8

The unmoistened aromatic polyamide articles obtained in Example 1 were left in the desicators containing sulfuric acid where the relative humidity was adjusted to 100%, 40%, and 30% respectively at 22° C. for 60 hours to obtain moistened aromatic polyamide articles, each having a percent moisture absorption of 15%, 4.5%, and 2.5% and an X-ray crystallinity of 8%, 9%, and 9%. These moistened articles were made to contact a hot plate heated at 300° C. for 1 minute to obtain pneumatic cellular aromatic polyamide articles as shown in Table 2.

TABLE 2

| Example | Moisture absorption (%) | Void ratio (%) | Minimum thickness (mm) | Strength (g/de) | Elongation percentage (%) |
|---|---|---|---|---|---|
| 6 | 15 | 90 | 1.3 | 1.3 | 25 |
| 7 | 4.5 | 20 | 0.6 | 1.3 | 23 |
| 8 | 2.5 | 12 | 0.5 | 1.3 | 28 |

COMPARISON 1

The unfoamed aromatic polyamide article obtained in Example 1 but not yet moistened was left in a desicator of sulfuric acid where the relative humidity was 0% at 22° C. Thus obtained article substantially having a percent moisture absorption of 0% and an X-ray crystallinity of 10% was made to contact with hot plate heated at 300° C. for 1 minute but no foaming took place and accordingly no foamed article was obtained.

EXAMPLE 9

Dried polymer powder having an average particle size of 200 μm of poly-m-xylylene isophthalamide (having the intrinsic viscosity of 0.7 determined in NMP and the softening point of 230° C., prepared by polymerizing 50 parts of m-xylylenediamine and 50 parts of isophthalic acid chloride at the tetrahydrofuran-water interface was preheated up to 300° C. The polymer powder was then supplied to the meshy spinneret made of 15-mesh stainless steel plain weave wire mesh having a meshed spinning area of 10 mm of 100 mm charged with 65-ampere electric current and was melted. The polymer was then made to pass through the tapered slit having a 10 mm×100 mm-inlet and a 2 mm×100 mm-outlet charged with 35-ampere electric current and taken up at a rate of 0.15 m/min to give an unfoamed article in the form of a plate. The article was placed in a desicator containing sulfuric acid where the relative humidity was 70% at 22° C. to give an article having a percent moisture absorption of 8% and an X-ray crystallinity of 8%. The article was heated up to a temperature of more than 260° C. to 290° C. with the high frequency heater to obtain a pneumatic cellular aromatic polyamide article having a void ratio of 83%, minimum thickness of 4.3 mm, and machine direction strength of 12 kg/mm$^2$.

EXAMPLE 10

Fifty parts of 3,4'-diaminodiphenyl ether and 50 parts of terephthalic acid chloride were polymerized in NMP and the generated hydrogen chloride was neutralized with calcium carbonate of equivalent weight. The resulting dope was dropped little by little in water with stirring, washed thoroughly, dried, and pulverized with the granulator to obtain polymer powder having an average particle size of 300 μm. The intrinsic viscosity of the polymer powder determined in NMP was 1.7 and the softening point was 290° C. The polymer powder was preheated to 380° C. and then supplied to the meshy spinneret made of 15-mesh stainless steel plain weave wire mesh having a meshed spinning area of 10 mm by 100 mm charged with 7.5 ampere electric current, melted there, discharged therefrom, cooled, and taken up at a rate of 10 cm/min to obtain a bristle-like fiber assembly, each bristle having an almost square cross section with a size of 0.6 mm by 0.6 mm. This assembly was immersed in water to obtain unfoamed articles having a percent moisture absorption of 12% and an X-ray crystallinity of 7%. The unfoamed articles were heated rapidly up to 400° C. in the infrared heating box to obtain pneumatic cellular aromatic polyamide articles having a void ratio of 92%, minimum thickness of 1.5 mm, and strength of 2.0 g/de.

EXAMPLE 11

A fiber assembly was prepared according to the method and by use of the apparatus proposed by U.S. patent application Ser. No. 465,339 (corresponding to European Patent Application No. 83300653.9) from polymer powder of poly(m-phenylene isophthalamide) (hereinafter referred to as PMIA) obtained by polymerizing m-phenylenediamine and isophthalic acid chloride at the tetrahydrofuran-water interface. The prepared fiber assembly was immediately made to absorb moisture and then heated to have the respective fibers foamed, thus giving pneumatic cellular PMIA fibers of the present invention continuously.

This example will be explained in detail in the following.

PMIA powder used in this example was a secondary coagulum of fine powder and the particles had an average diameter of about 50 μm when seen under a microscope.

The intrinsic viscosity of this PMIA was 1.0 when the measurement was made with the use of a capillary viscometer on a solution prepared by disolving PMIA powder in N-methylpyrrolidone at concentration of 0.5 g/100 ml.

The differential thermal analysis (DTA) was conducted while raising the temperature at a rate of 10° C./min in nitrogen to investigate the thermal properties of this PMIA and its starting point of melting was observed in the visinity of about 400° C. Also the thermogravimetric analysis was conducted while raising the temperature at a rate of 10° C./min in the air and the weight loss gradually started in the neighborhood of 350° C. seemingly resulting from the oxidative decomposition and the decomposition was observed rapidly progressing in the neighborhood of 430° C. Furthermore, the compression test made on this PMIA with the use of a compression testing machine of plunger type at 350° C. to examine its thermal compression property clarified that its packing density was 95% to 100% under pressure of about 2 kg/cm$^2$.

Many pieces of plate-like rectangular articles having lengths of 12 cm, 0.95 cm, and 9.5 cm for l, m, and n respectively as shown in FIG. 4 and the packing density of 60% were compression molded from said PMIA powder with the use of a compression molding machine at 270° C.

Pneumatic cellular PMIA fiber assembly of the present invention was prepared continuously from the articles prepared in the above using the equipment shown in FIG. 1.

The conditions of preparing unfoamed PMIA fiber assembly (FIG. 1, 6) are shown in Table 3.

TABLE 3

| | | Sign | Unit | Data |
|---|---|---|---|---|
| Die | Die pass length | $C_1$ | cm | 30 |
| | | $C_2$ | cm | 20 |
| | | $C_3$ | cm | 10 |
| | Die temperature | $H_1$ | °C. | 240 |
| | | $H_2$ | °C. | 280 |
| | | $H_3$ | °C. | 340 |
| Roller | Rotating rate of feeding rollers 3 | $V_R$ | cm/min | 7.0 |
| | Rotating rate of taking up rollers 7 | $V_L$ | cm/min | 17.0 |
| Spinneret | Mesh count of stainless steel plain weave mesh | Mesh | count/in | 20 |
| | Spinning area | $d_3 \times l_3$ | cm $\times$ cm | $1.2 \times 10$ |
| | Electric energy | Wc | w/cm$^2$ | 4 |
| Result | Total denier of fiber assembly | De | de | $2.7 \times 10^6$ |
| | Average denier of single fiber | $\overline{de}$ | de | 360 |
| | Average thickness of single fiber | $\overline{df}$ | mm | 0.19 |
| | X-ray crystallinity | $X_{cr}$ | % | 9 |

The unfoamed PMIA fiber assembly prepared under the abovementioned conditions was immedately led into the steam box 8 filled with steam at 120° C. under pressure of 2 kg/cm$^2$ to absorb moisture forcedly for 30 minutes up to a percent moisture absorption of 12%. The moistened fiber assembly was let into the heating box 10 kept at 300° C. where the assembly was heated fast and foamed.

The cross section (A) and longitudinal section (B) of the fiber were photographed through a scanning electron microscope to give the photographs shown in FIG. 8. These photographs clearly show that the pneumatic cellular PMIA fiber has such a strong incrustation covered with a smooth surface as natural fistular or cellular plants (for instance, bamboo, kapok fiber, etc.) and is made up of many large cells, thus presenting a foamed structure of the new type which is not seen among the conventional foamed fibers.

The results of the measurement made on the physical properties of this fiber are shown in Table 4.

TABLE 4

| | Unit | Data |
|---|---|---|
| Average thickness of fiber | mm | 0.5 |
| Void ratio | % | 85 |
| Strength | g/de | 1.3 |
| Elongation percentage | % | 24 |

A plain weave having a density of 55 warps/inch and 55 wefts/inch was trially woven from thus foamed PMIA fibers and its thermal conductivity was $1.4 \times 10^{-4}$ cal·cm/sec·cm$^2$·°C. when determined according to ASTM test C-177. On the other hand, the thermal conductivity of a plain weave fabric having the same unit weight of 190 g/m$^2$ made from conventional PMIA fibers (3 de) prepared according to the wet method was $2.2 \times 10^{-4}$ cal·cm/sec·cm$^2$·°C., which proves that the foamed PMIA fibers of the present invention have an excellent thermal insulation property.

EXAMPLE 12

A foamed film was prepared from the same poly(m-phenylene isophthalamide) (PMIA) powder as Example 11 according to the present invention. A detailed description of the example will be given below.

First, many pieces of plate-like rectangular articles having lengths of 5 cm, 0.4 cm, and 9.5 cm for l, m, and n respectively as shown in FIG. 4 and the packing density of 60% were compression molded from PMIA powder with the use of a compression molding machine at 270° C.

Then an unfoamed PMIA film was prepared from these articles with the use of a continuous film extruding machine as shown in FIG. 2. This unfoamed PMIA film was further subjected to the foaming treatment with the use of the same equipment under the same conditions as Example 11 to obtain a foamed film.

The conditions of preparing the unfoamed PMIA film are shown in Table 5. Incidentally, the moisture absorption of this unfoamed PMIA film after the steam treatment was 10%. The result of measurements of physical properties of the foamed PMIA film are shown in Table 6.

TABLE 5

| | | Sign | Unit | Data |
|---|---|---|---|---|
| Die | Die pass length | $C_1$ | cm | 30 |
| | | $C_2$ | cm | 10 |
| | | $C_3$ | cm | 0.5 |
| | Slit clearance | $d_3$ | cm | 0.2 |
| | Die temperature | $H_1$ | °C. | 200 |
| | | $H_2$ | °C. | 270 |
| | | $H_3$ | °C. | 370 |
| Roller | Feed roller speed | $V_R$ | cm/min | 5.0 |
| | Take-up roller speed | $V_L$ | cm/min | 30 |
| Result | Film thickness | mf | mm | 0.5 |
| | Film width | nf | mm | 8.0 |
| | Crystallinity | $X_{cr}$ | % | 8 |

TABLE 6

| | Unit | Data |
|---|---|---|
| Thickness | mm | 2.5 |
| Void ratio | % | 80 |
| Strength | gr/cm | 60 |
| Elongation | % | 20 |
| Thermal conductivity | cal · cm/sec · cm$^2$ · °C. | $1.7 \times 10^{-4}$ |

The thermal conductivity of the above-mentioned foamed PMIA film of the present invention was about ⅓ of the film before the foaming treatment, thus proving that the foamed film has an outstanding thermal insulation property.

What we claim is:

1. A process for the preparation of pneumatic cellular aromatic polyamide articles comprising heating the aromatic polyamide article, which
   (i) is substantially composed of aromatic polyamide,
   (ii) contains moisture at a percent moisture absorption of 2 to 30% by weight.
   (iii) has an average thickness of 0.1 to 3 mm, and
   (iv) has an X-ray crystallinity of 30% and below, at a temperature in the range between the softening point and the melting point of the aromatic polyamide while keeping the above-mentioned percent moisture absorption at least until the article is heated up to the softening point.

2. The process for the preparation of pneumatic cellular aromatic polyamide articles according to claim 1, wherein the percent moisture absorption of said aromatic polyamide articles is 4 to 15% by weight.

3. The process for the preparation of pneumatic cellular aromatic polyamide articles according to claim 1, wherein said heating is conducted at a temperature in the range between "the softening point of aromatic polyamide+30° C." and "the melting point of aromatic polyamide−30° C.".

* * * * *